Oct. 30, 1928.
V. L. ABEL
1,689,514
CAGE FOR ROLLER BEARINGS
Filed Feb. 7, 1927
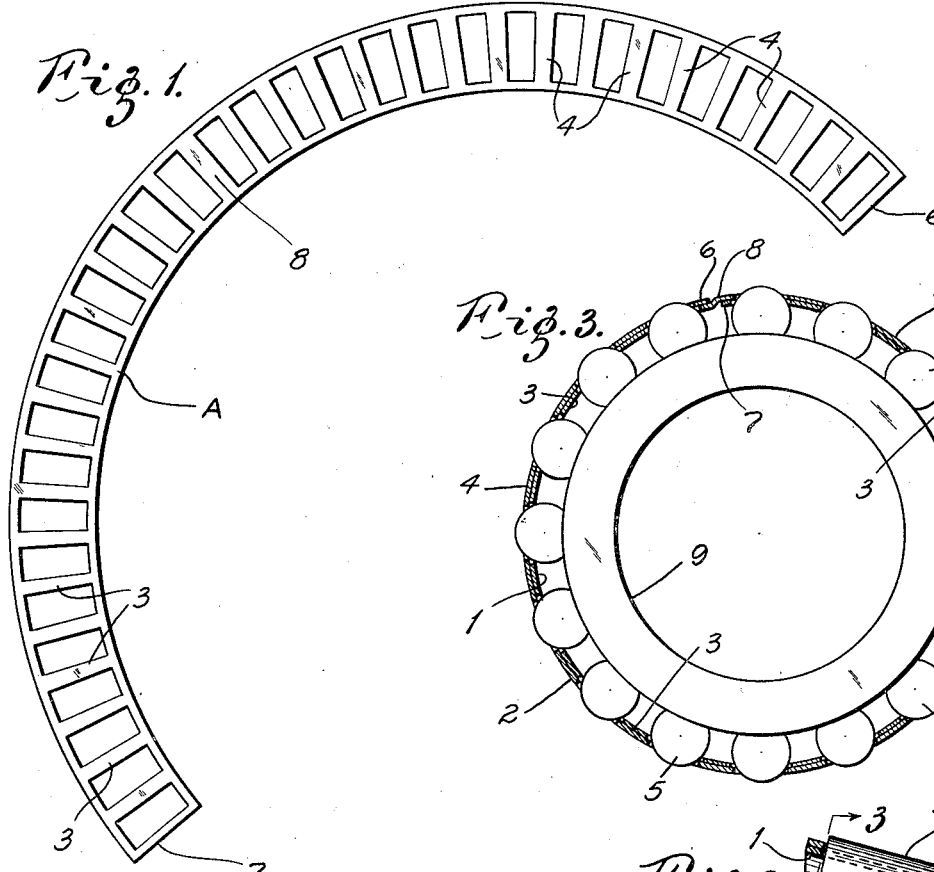
INVENTOR.
Virgil L. Abel
HIS ATTORNEYS Patented Oct. 30, 1928.

1,689,514

UNITED STATES PATENT OFFICE.

VIRGIL L. ABEL, OF CANTON, OHIO, ASSIGNOR TO THE TIMKEN ROLLER BEARING COMPANY, OF CANTON, OHIO, A CORPORATION OF OHIO.

CAGE FOR ROLLER BEARINGS.

Application filed February 7, 1927. Serial No. 166,468.

My invention relates to cages for roller bearings and has for its principal object a cage that facilitates the operations of assembling and disassembling roller bearings, but makes it possible to remove one or more rollers without injuring the cage and that is free to yield under pressure without becoming permanently injured. The invention consists principally in a cage comprising a perforated strip wrapped around itself to form a ring of double thickness. The invention further consists in the cage for roller bearings hereinafter described and claimed.

In the accompanying drawing,

Fig. 1 is a plan view of a strip from which the cage is made;

Fig. 2 is a longitudinal sectional view of a roller bearing embodying said cage;

Fig. 3 is an end view of an assembled roller bearing embodying said cage, the end ring of the cage being broken away as indicated by the section line 3—3 in Fig. 2;

Fig. 4 is a sectional view similar to Fig. 2 showing a bearing in partly assembled position; and Fig. 5 is a view similar to Fig. 3 of the bearing in the same condition as in Fig. 4.

The cage comprises a perforated strip A wrapped around itself to form a conical shell of double thickness. The perforations of the inner ring 1 are in alinement with the perforations of the outer ring 2, the bridges 3 or roller spacing members of the inner ring contacting throughout their length with the bridges 4 or roller spacing elements of the outer ring. The inner bridges 3 are narrower than the outer bridges 4 and do not contact with the rolls 5 of the bearing. The outer bridges 4 retain the rolls 5 in their pockets. The spaces between the outer bridges 4 are wide enough to permit the desired freedom of the rolls. Both windings of the cage are preferably radially outward from the axes of the rollers.

The outer end 6 of the shell is adjacent to the inner end 7 of the shell and the bridge 8 at the meeting point of said two ends is crimped or offset, so as to lie partly in the inner shell and partly in the outer shell, thus avoiding having three thicknesses of metal at this point. In perforating the blank A said bridge 8 is made wide enough to allow for the crimping.

When rolls are spaced in the pockets of the cage, the cone 9 may be easily positioned, the cage expanding as required until the rolls 5 snap over the rib 10 on the small end of the cone, the cage thereupon contracting to the normal position shown in Figs. 2 and 3. Figs. 4 and 5 show the position of the parts of the bearing as they are being assembled. The inner and outer portions of the cage are separated and then snap back together when the rolls clear the rib of the cone. The cage and rolls may be removed, and one or more new rolls put in position without injuring the cage. The cage is free to yield as required without being injured. The closing in operation required with ordinary cages is not required with this cage.

What I claim is:

1. A conical cage for roller bearings and the like comprising a perforated strip wrapped on itself to form a cage of double thickness and comprising end rings connected by bridges, the perforations of the inner portion being wider than the perforations of the outer portion, and the bridges of the inner portion of the cage contacting throughout their length with the bridges of the outer portion.

2. A cage for roller bearings and the like comprising a perforated strip wrapped on itself to form two complete windings the perforations of the two windings being in alinement to form pockets for rollers, the cage being offset at the point adjacent the two ends of the strip.

3. A conical cage for roller bearings and the like comprising a perforated strip wrapped on itself to form a cage of double thickness comprising end rings connected by bridges, the bridges of the inner portion being narrower than the bridges of the outer portion, both ends of said strip terminating adjacent to the same bridge and said bridge being offset so as to lie partly in alinement with one of said ends and partly in alinement with the other end.

4. A roller bearing comprising a conical inner bearing member, conical rollers thereon, and a strip of perforated metal wrapped on itself to form a cage of double thickness for said rollers, both thicknesses of said cage being disposed radially outward from the axes of said rollers and the portions of the outer thickness between perforations being enough wider than the corresponding portions of the inner thickness that said portions of the inner thickness are clear of the rollers.

Signed at Canton, Ohio, this 31st day of January, 1927.

VIRGIL L. ABEL.